(12) United States Patent
Bartos et al.

(10) Patent No.: US 8,087,501 B2
(45) Date of Patent: Jan. 3, 2012

(54) HYDRAULIC ONE-WAY DISC CLUTCH ASSEMBLY

(75) Inventors: Andrew L. Bartos, Clarkston, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 615 days.

(21) Appl. No.: 12/271,988

(22) Filed: Nov. 17, 2008

(65) Prior Publication Data

US 2010/0122888 A1 May 20, 2010

(51) Int. Cl.
*F16D 41/00* (2006.01)
*F16D 25/0638* (2006.01)

(52) U.S. Cl. ............... 192/41 R; 192/48.611; 192/54.3; 192/85.3

(58) Field of Classification Search ............ 192/54.3, 192/85.27, 85.29–85.31, 103 C; 188/82.9, 188/181 T See application file for complete search history.

(56) References Cited

U.S. PATENT DOCUMENTS

| | | | | | |
|---|---|---|---|---|---|
| 2,521,117 | A | * | 9/1950 | Du Bois et al. | 60/357 |
| 3,900,089 | A | * | 8/1975 | Ivey | 192/85.3 |
| 4,083,442 | A | * | 4/1978 | Ushijima | 192/54.3 |
| 4,805,752 | A | * | 2/1989 | Malloy et al. | 192/85.42 |
| 4,969,546 | A | * | 11/1990 | Haka | 192/85.41 |

* cited by examiner

*Primary Examiner* — Richard M. Lorence
(74) *Attorney, Agent, or Firm* — Quinn Law Group, PLLC

(57) ABSTRACT

A hydraulic one-way clutch assembly (HOWC) is configured for use in a vehicle transmission. The HOWC assembly includes a non-rotatable disc and a rotatable disc. The non-rotatable disc extends about an axis and defines at least one exhaust port extending therethrough. The rotatable disc extends about the axis and is disposed axially adjacent the non-rotatable disc. The rotatable disc is configured to rotate relative to the non-rotatable disc, about the axis, between a closed position and an open position. The rotatable disc covers the exhaust passage when the rotatable disc is in the closed position to prevent fluid from flowing out through the at least one exhaust port. The rotatable disc uncovers the exhaust port when the rotatable disc is in the closed position to allow fluid to flow out through the at least one exhaust port.

19 Claims, 4 Drawing Sheets

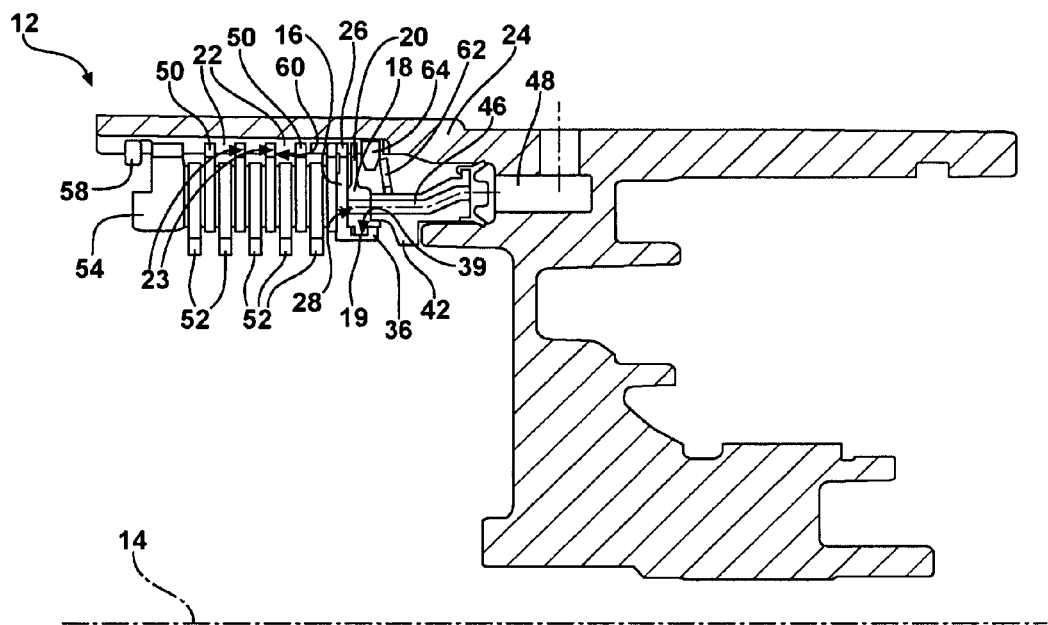
FIG. 1
FIG. 7
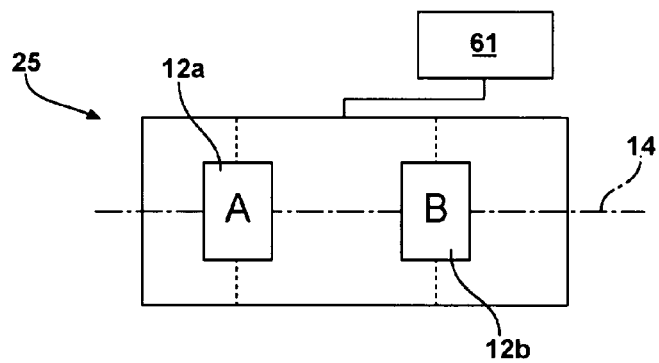

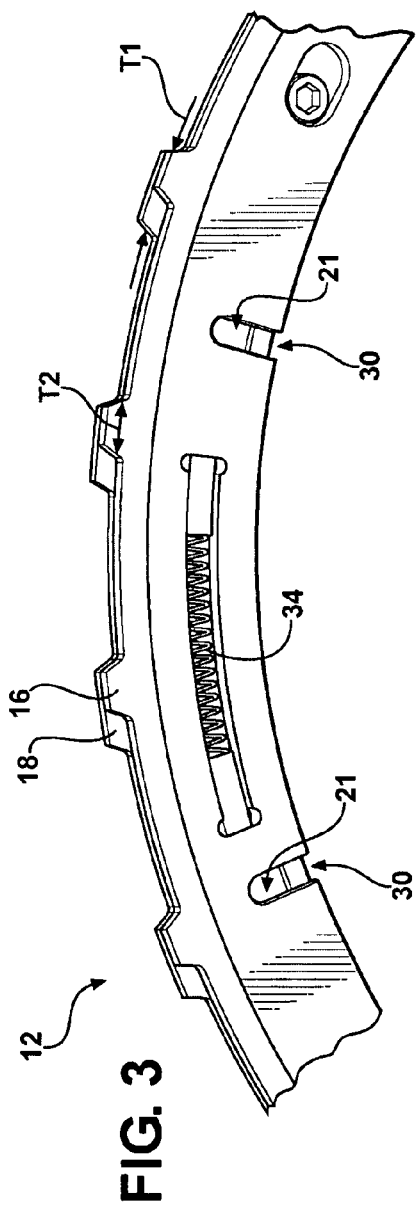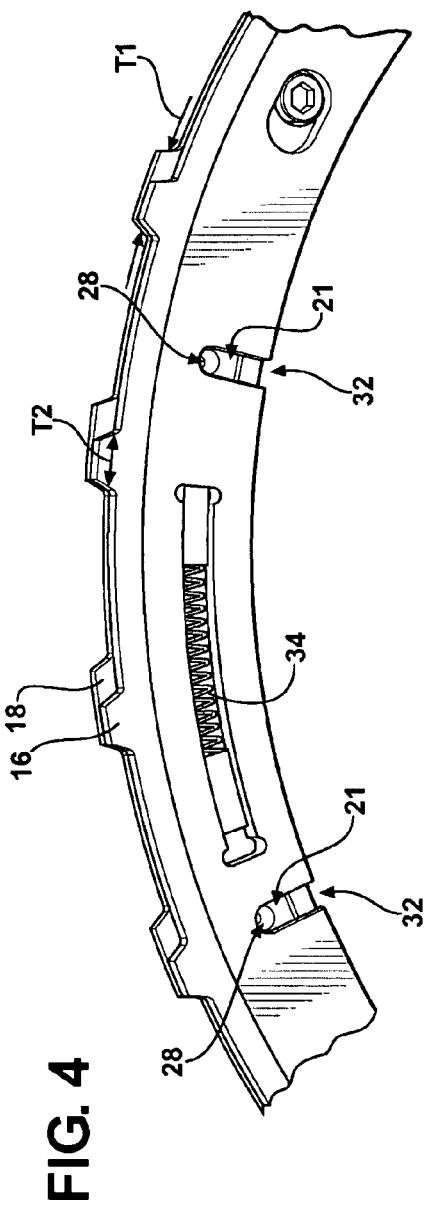

HYDRAULIC ONE-WAY DISC CLUTCH ASSEMBLY

TECHNICAL FIELD

The present invention relates to a one-way disc clutch for a transmission.

BACKGROUND OF THE INVENTION

In vehicle automatic transmissions, a smooth upshift (i.e., ratio change) between two friction elements, commonly referred to as a clutch-to-clutch shift, is a difficult task to perform consistently. The torque capacity of the oncoming friction element must be precisely synchronized to the torque capacity of the off-going friction element to produce a pleasingly smooth reduction in output torque (multiplied by the mechanical advantage of the transmission gear train) without any appreciable change in engine speed during the event. Changing characteristics, such as fluid properties, coefficients of friction between the friction elements, and temperature can negatively impact the quality of the clutch-to-clutch shift.

SUMMARY OF THE INVENTION

A hydraulic one-way clutch (HOWC) is configured for use in a vehicle transmission. The HOWC assembly includes a non-rotatable disc and a rotatable disc. The non-rotatable disc extends about an axis and defines at least one exhaust port extending therethrough. The rotatable disc extends about the axis and is disposed axially adjacent the non-rotatable disc. The rotatable disc is configured to rotate relative to the non-rotatable disc, about the axis, between a closed position and an open position. The rotatable disc covers the exhaust port when the rotatable disc is in the closed position to prevent fluid from flowing out through the at least one exhaust port. The rotatable disc uncovers the exhaust port when the rotatable disc is in the open position to allow fluid to flow out through the at least one exhaust port.

A hydraulic one-way clutch assembly (HOWC assembly) is configured for disposition within a vehicle transmission. The HOWC assembly includes a housing, a non-rotatable disc, and a rotatable disc. The housing includes a plurality of internal teeth. The non-rotatable disc extends about an axis and includes a plurality of first external teeth that extend radially away from the axis. Each of the first external teeth defines a first tooth thickness. The rotatable disc extends about the axis and includes a plurality of second external teeth that extend radially away from the axis. Each of the second external teeth defines a second tooth thickness. Each of the first external teeth engages a respective one of the plurality of internal teeth to prevent relative rotation about the axis between the non-rotatable disc and the housing. Each of the second external teeth engages a respective one of the plurality of internal teeth. The engagement between the internal teeth and the second external teeth allows a finite degree of relative rotation about the axis between the rotatable disc and each of the non-rotatable disc and the housing. The relative rotation about the axis allows the rotatable disc to rotate between a closed position and an open position to control flow of fluid from the non-rotatable disc.

A transmission includes a hydraulic one-way clutch assembly (HOWC assembly), a second clutch assembly, and a control system. The HOWC assembly extends about an axis and includes a non-rotatable disc and a rotatable disc. The non-rotatable disc extends about an axis and includes a plurality of first external teeth that extend radially away from the axis. Each of the first external teeth defines a first tooth thickness. The rotatable disc extends about the axis and includes a plurality of second external teeth that extend radially away from the axis. Each of the second external teeth defines a second tooth thickness. Each of the first external teeth engages a respective one of the plurality of internal teeth to prevent relative rotation about the axis between the non-rotatable disc and the housing. Each of the second external teeth engages a respective one of the plurality of internal teeth to allow a finite degree of relative rotation about the axis between the rotatable disc and each of the non-rotatable disc and the housing. The relative rotation allows the rotatable disc to rotate between a closed position and an open position to control flow of fluid from the non-rotatable disc. The second clutch assembly extends about the axis and is configured to engage and transmit torque about the axis when the second clutch assembly is engaged. The control system is operatively connected to the HOWC assembly and the second clutch assembly to shift engagement between the HOWC assembly and the second clutch assembly. The control system operates to engage one of the HOWC assembly and the second clutch assembly to transmit torque therethrough. The control system also operates to disengage the other of the HOWC assembly and the second clutch assembly to eliminate the transmission of torque therethrough.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 1 is a schematic partial cross-sectional view of a hydraulic one-way disc clutch assembly (HOWC assembly) and a housing for a vehicle transmission;

FIG. 3 is a schematic partial perspective top view of a rotatable disc and a non-rotatable disc of the HOWC assembly with the rotatable disc shown in a closed position;

FIG. 4 is a schematic partial perspective top view of the rotatable disc and the non-rotatable disc of the HOWC assembly with the rotatable disc shown in an open position;

FIG. 7 is a schematic view of the transmission illustrating two clutches and a control system.

DESCRIPTION OF THE PREFERRED EMBODIMENTS

Figure 2:
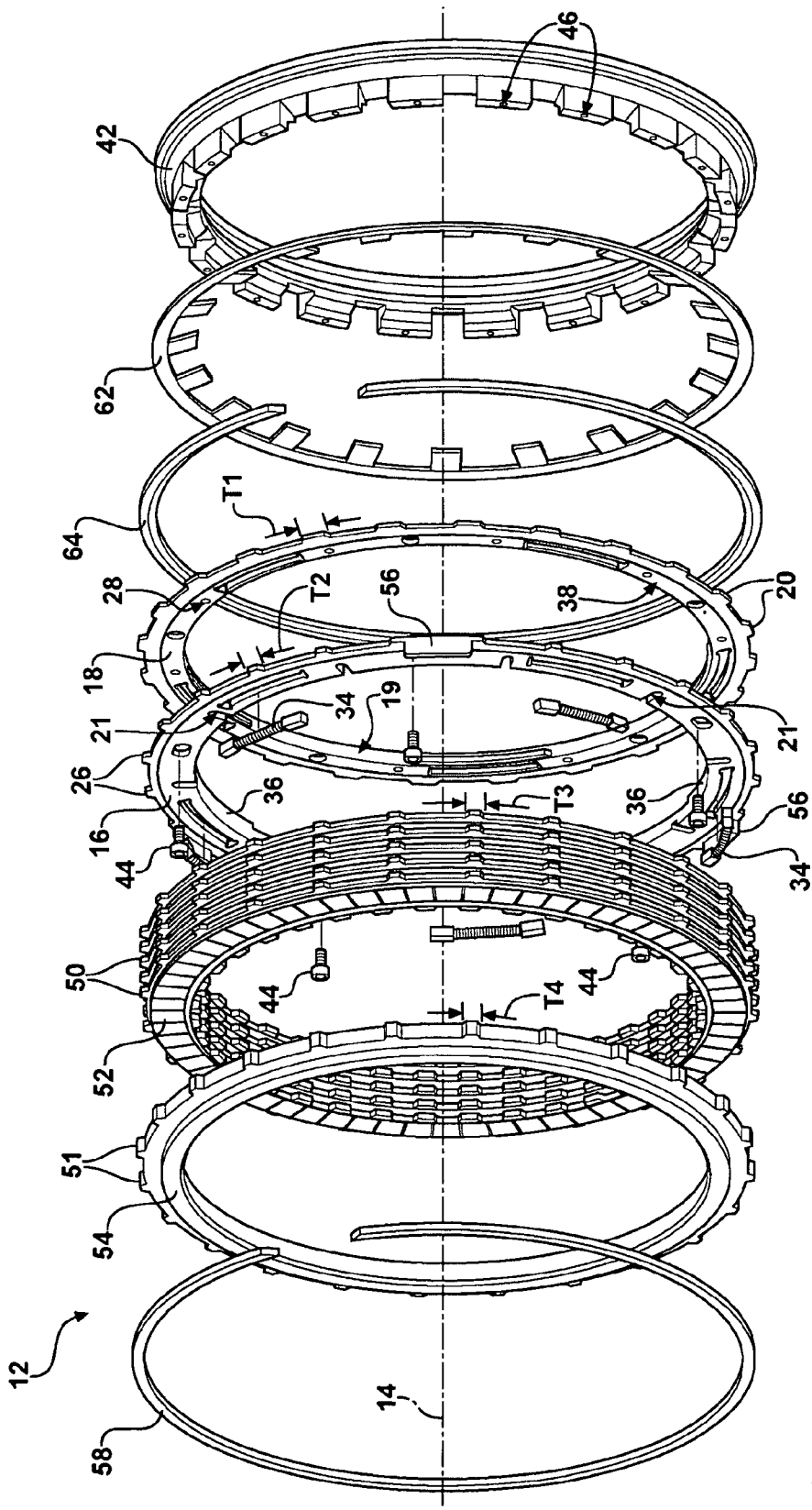
FIG. 2 is an exploded schematic perspective top view of the HOWC assembly of FIG. 1.
Figure 5:
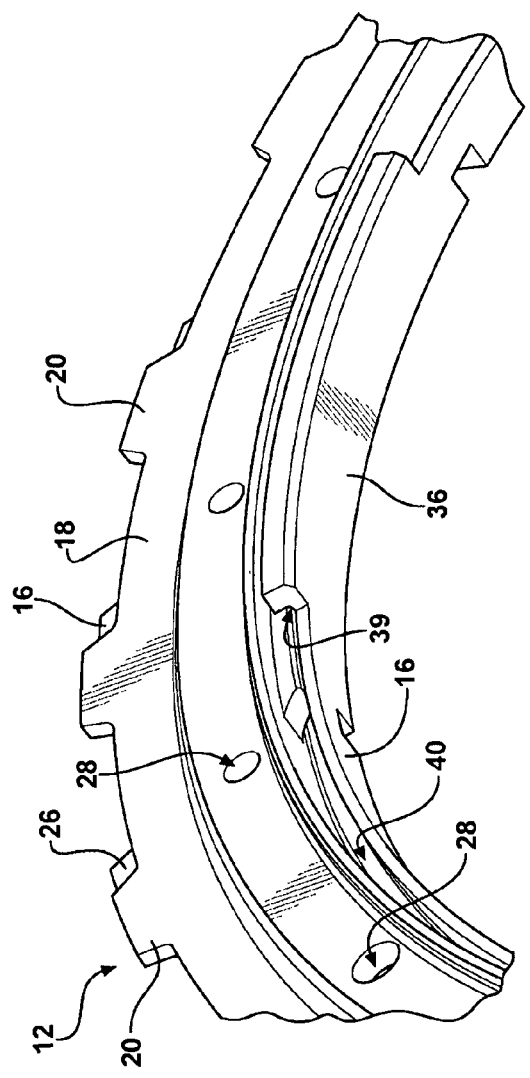
FIG. 5 is a schematic partial perspective bottom view of a disc interlock of the rotatable disc engaging the rotatable disc to hold the rotatable disc to the non-rotatable disc.

Referring to the drawings, wherein like reference numbers refer to like components, FIG. 1 shows a hydraulic one-way disc clutch assembly 12, i.e., a HOWC assembly 12, having an axis of rotation 14. Therefore, the term "axial" and "axial direction" as used herein refers to the relative position of a given feature or movement with respect to the axis 14. The HOWC assembly 12 is configured for use within a housing 24 of a vehicle transmission (not shown). The housing 24 includes a plurality of internal spline teeth 22 configured for meshing engagement with the HOWC assembly 12. Each of the internal spline teeth 22 extend radially toward the axis 14.

The HOWC assembly 12 includes a pair of interlocking discs 16, 18, i.e., a rotatable disc 16 and a non-rotatable disc 18. The non-rotatable disc 18 includes a plurality of first external spline teeth 20 and the nen-rotatable disc 16 includes a plurality of second external spline teeth 26. Each of the spline teeth 20, 26 extend radially from the respective disc 16, 18. The non-rotatable disc 18 includes an inward facing edge 19 that surrounds the axis 14. The rotatable disc defines a plurality of exhaust grooves 21 extending therethrough. A first tooth thickness T1 of each of the first external spline teeth 20 on the non-rotatable disc 18 is such that when the second external spline teeth are engaged with the corresponding first internal spline teeth 22 on the support housing 24, the non-rotatable disc 18 may then translate axially within the housing 24, but is prevented from rotating relative to the housing 24. A second tooth thickness T2 of the second external spline 26 on the rotatable disc 16, however, is reduced to permit a specified degree of angular rotation of the rotatable disc 16 with respect to the support housing 24 and the non-rotatable disc 18. The amount of rotation of the rotatable disc 16 with respect to the non-rotatable disc 18 is sufficient to open and close a plurality of hydraulic exhaust ports 28 defined within the non-rotatable disc 18. Therefore, the rotatable disc 16 rotates about the axis 14 between a closed position 30, as shown in FIG. 3, and an open position 32, as shown in FIG. 4. The exhaust ports 28 are closed when the exhaust ports 28 are covered by the rotatable disc 16, as shown in FIG. 3. Likewise, the exhaust ports 28 are open when one of the exhaust grooves 21 is aligned with the respective exhaust port 28 to allow fluid to flow out of the exhaust port 28 within the non-rotatable disc 18 and through the exhaust groove 21 in the rotatable disc 16, as shown in FIG. 4. The exhaust ports 28 are biased to a normally closed position 30 by a biasing device 34. The biasing device 34 may be one or more return springs 34, as shown in FIGS. 2-4. The return springs 34 are secured at opposing ends between the rotatable disc 16 and the non-rotatable disc 18 to hold the rotatable disc 16 in the normally closed position 30. It should be appreciated, however, that any other biasing device 34 and configuration may also be used as known to those skilled in the art.

The rotatable disc 16 includes a pair of opposing first faces 40 and the non-rotatable disc 18 includes a pair of opposing second faces 38. Each face 40, 38 may extend in generally perpendicular relationship to the axis 14. At least one disc interlock 36 may extend axially from one of the first faces 40. Each disc interlock 36 may extend in spaced and generally parallel relationship to the axis 14. The disc interlock 36 may have a general C-shape and define a groove 39. The disc interlock 36 engages a corresponding portion of the inward edge 19 of the non-rotatable disc 18 to hold the face 40 in close contact with the corresponding second face 38 of the non-rotatable disc 18 at all times during operation of the HOWC assembly 12. The close contact between the corresponding faces 40, 38 helps to minimize hydraulic fluid loss through the exhaust ports 28 when the rotatable disc 16 is in the normally closed position 30.

The non-rotatable disc 18 may be fixed to the piston 42 with a plurality of fasteners 44. Other attaching methods may also be employed as known to those skilled in the art. A plurality of exhaust passages 46 may be defined through the piston 42 and be in fluid communication with the respective exhaust port 28 defined in the non-rotatable disc 18. The housing 24 defines an apply pressure cavity 48. The apply pressure cavity 48 opens to the exhaust passages 46 to fluidly connect the apply pressure cavity 48 to each of the exhaust ports 28, defined in the non-rotatable disc 18.

Figure 6:
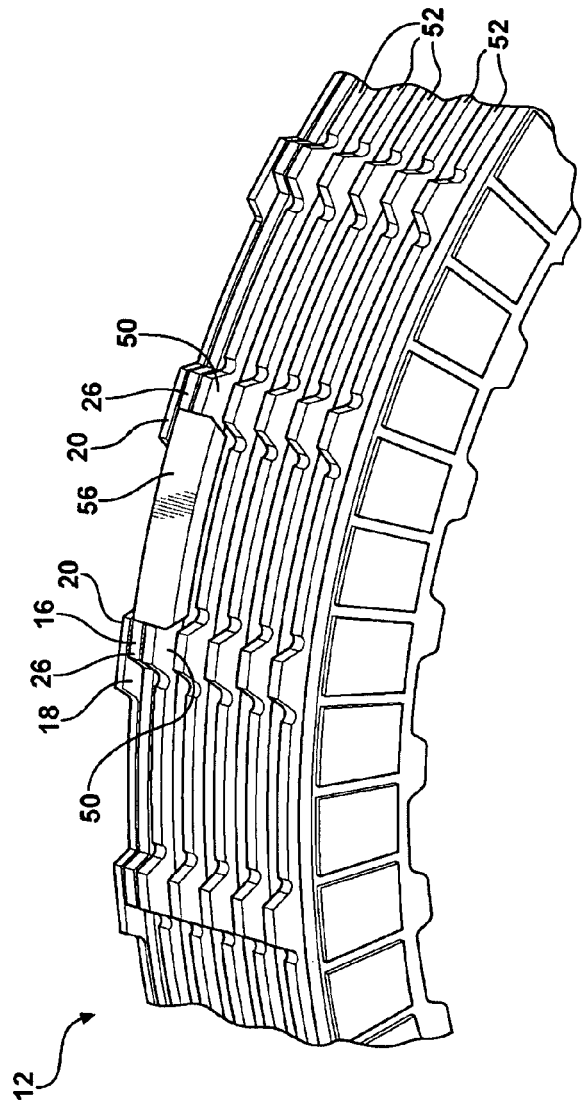
FIG. 6 is a schematic partial perspective top view of a friction element, the rotatable disc, and the non-rotatable disc with a drive tang of the rotatable disc engaging teeth of the friction element.

As shown in FIG. 6, the HOWC assembly 12 also includes a friction element 52 and a backing plate 54. The friction element 52 includes a plurality of third external teeth 50 extending radially away from the axis 14. The backing plate 54 includes a plurality of fourth external teeth 51 extending radially away from the axis 14. A third tooth thicknesses T3 of the third external teeth 50 on the friction element 52 and a fourth tooth thickness T4 of the fourth external teeth 51 of the backing plate 54 may also be reduced in width. This is similar to the spline teeth 26 on the rotatable disc 16, to permit limited rotation of those components about the axis, relative to the non-rotatable disc 18 and the housing 24. A plurality of drive tangs 56 may extend axially away from one of the faces 40 of the rotatable disc 16 to extend between a corresponding pair of third external teeth 50 of the friction element 52. Each drive tang 56 ensures that any rotation of the friction element 52 that is associated with the corresponding third external teeth 50 is transmitted directly to the rotatable disc 16 to rotate the rotatable disc 16 to either the closed position 30 or the open position 32, based on the direction of rotation about the axis 14.

Referring to FIG. 7, the transmission 25 may include a control system 61. The control system 61 is configured to control a clutch-to-clutch shift event. In a clutch-to-clutch shift event within the transmission 25, fluid under pressure is directed to the apply pressure cavity 48 of the HOWC assembly 12a, or clutch A. With the exhaust ports 28 within the non-rotatable disc 18 in the normally closed position 30, an increase in hydraulic pressure in the apply pressure cavity 48 causes the piston 42 to move in the direction of the friction element 52 to apply clutch A. A torque may then be transmitted across the internally and externally splined components of the friction element 52. The torque is transmitted in the same rotational direction as the torque applied to the rotatable disc 16 by the disc return springs 34. Therefore, the exhaust ports 28 will stay in the normally closed position 30 while clutch A remains applied.

During the clutch-to-clutch shift event, the friction element in an oncoming clutch 12b, clutch B, begins to be hydraulically applied in a manner similar to that described above for clutch A. Clutch B may be any type of clutch known to those skilled in the art that is located within the transmission 25. Clutch B may also be another HOWC assembly 12b if it will be used as an off going clutch for a subsequent clutch-to-clutch shift.

As clutch B is applied, the torque capacity of the oncoming friction element, multiplied by a mechanical advantage of a transmission gear train, increases and reacts against the friction element 52 of clutch A. When a reaction torque of clutch B reaches a level equal to a sliding force defined between the rotatable 16 disc and non-rotatable disc 18 and between the backing plate 54 and the backing plate retaining ring 58, the external spline teeth 50 on the friction element 52 of clutch A become "unloaded". Since all of the external spline teeth 50 on the friction elements 52 of clutch A are of a reduced tooth thickness T3, the entire friction element 52 rotates until the opposing tooth faces 60 of the friction element 52 contact opposite faces 23 of the internal spline teeth 22 within the support housing 24. Because one or more of the externally splined friction elements 52 is drivingly connected to the rotatable disc 16 by the drive tangs 56, and because the rotatable disc 16 has external spline teeth 26 of reduced tooth thickness, the rotatable disc 16 rotates the same amount. The relative motion between the rotatable disc 16 and the non-rotatable disc 18 causes the exhaust ports 28 in the latter disc to open. The hydraulic fluid keeping clutch A applied is released through the exhaust ports 28, and a significant decrease in the torque capacity of clutch A occurs. At approximately this same time, the transmission control stops the flow of fluid, i.e., hydraulic oil, to the clutch A apply pressure cavity 48. The piston return spring 62, reacting against a spring retaining ring 64, moves the piston 42 in a direction away from the friction element 52. The power flow is thereby smoothly transferred from clutch A to clutch B.

As clutch A is released, the torque exerted by the disc return springs 34 on the rotatable disc 16 exceeds the sliding force between the rotatable disc 16 and the non-rotatable disc 18. The rotatable disc 16 therefore rotates about the axis 14 from the open position 32 to the normally closed position 30 such that the exhaust ports 28 are blocked by the rotatable disc 16.

During the event described above, the hydraulic pressure to the off-going clutch, clutch A, must still be reduced to zero by the control system 61 at a proper time. The HOWC assembly 12 reduces the importance of the "timing" of that reduction with respect to the application of hydraulic pressure to the on-coming clutch, clutch B. Consequently, any overlap between the release of clutch A and the application of clutch B may be increased. Therefore, more consistent clutch-to-clutch shifts may be achieved.

While the best modes for carrying out the invention have been described in detail, those familiar with the art to which this invention relates will recognize various alternative designs and embodiments for practicing the invention within the scope of the appended claims.

The invention claimed is:

1. A hydraulic one-way clutch (HOWC) configured for use in a vehicle transmission, said HOWC comprising:
 a non-rotatable disc extending about an axis and defining at least one exhaust port extending therethrough;
 wherein said non-rotatable disc includes a plurality of first external teeth extending radially away from said axis;
 a rotatable disc extending about said axis and disposed axially adjacent said non-rotatable disc;
 wherein said rotatable disc includes a plurality of second external teeth extending radially away from said axis;
 wherein said rotatable disc is configured to rotate relative to said non-rotatable disc, about said axis, between a closed position and an open position;
 wherein said rotatable disc covers said at least one exhaust port when said rotatable disc is in said closed position to prevent fluid from flowing out through said at least one exhaust port;
 wherein said rotatable disc uncovers said at least one exhaust port when said rotatable disc is in said open position to allow fluid to flow out through said at least one exhaust port;
 wherein each of said first external teeth define a first tooth thickness configured to engage a housing within the transmission; and
 wherein each of said second external teeth define a second tooth thickness configured to engage the housing within the transmission and allow a finite degree of relative rotation between said rotatable disc and each of said non-rotatable disc and the housing such that said rotatable disc rotates between said closed position and said open position.

2. A HOWC, as set forth in claim 1, wherein said rotatable disc is biased to said closed position from said open position.

3. A HOWC, as set forth in claim 2, further comprising a biasing device reacting between said rotatable disc and said non-rotatable disc to bias said rotatable disc to said closed position from said open position.

4. A HOWC, as set forth in claim 3, wherein said biasing device is a spring.

5. A HOWC, as set forth in claim 1, further comprising a disc interlock configured to hold a first face of said rotatable disc in contact with a corresponding second face of said non-rotatable disc to minimize fluid loss through said at least one exhaust port of said non-rotatable disc when said rotatable disc is in said closed position.

6. A HOWC, as set forth in claim 5, wherein said disc interlock extends axially from said first face of said rotatable disc and engages said non-rotatable disc to hold said first face of said rotatable disc in contact with said second face of said non-rotatable disc.

7. A HOWC, as set forth in claim 6, wherein said disc interlock is generally C-shaped and defines a groove;
 wherein an inner surface of said non-rotatable disc is disposed in said groove such that said disc interlock engages said non-rotatable disc to hold said first face of said rotatable disc in contact with said second face of said non-rotatable disc.

8. A HOWC, as set forth in claim 1, further comprising a piston extending about said axis and defining at least one exhaust passage extending therethrough;
 wherein said piston is disposed axially adjacent said non-rotatable disc such that said non-rotatable disc is axially disposed between said rotatable disc and said piston;
 wherein said at least one exhaust passage is in fluid communication with said at least one exhaust port of said non-rotatable disc.

9. A HOWC, as set forth in claim 8, wherein said non-rotatable disc is affixed to said piston such that said piston and said non-rotatable disc are restrained from rotating relative to said rotatable disc.

10. A HOWC, as set forth in claim 8, further comprising a friction element extending about said axis;
 wherein said friction element is disposed axially adjacent said rotatable disc;
 wherein said friction element includes a plurality of third external teeth extending radially away from said axis;
 wherein each of said third external teeth defines a third tooth thickness configured to engage the housing within the transmission and allow a finite degree of relative rotation between said friction element and said non-rotatable disc and the housing such that said friction element rotates between said closed position and said open position.

11. A HOWC, as set forth in claim 10, further comprising a return spring extending about said axis and axially disposed between said piston and said non-rotatable disc to axially bias said piston away from said friction element.

12. A HOWC, as set forth in claim 10, further comprising at least one drive tang extending axially from said first face of said rotatable disc;
 wherein said drive tang is disposed between a corresponding pair of third external teeth of said friction element such that rotation of said friction element about said axis is transmitted to said rotatable disc.

13. A HOWC, as set forth in claim 1, wherein said rotatable disc defines at least one exhaust groove extending therethrough;
 wherein said at least one exhaust groove opens to said at least one exhaust port when said rotatable disc is in said open position.

14. A hydraulic one-way clutch assembly (HOWC assembly) configured for disposition within a vehicle transmission, said HOWC assembly comprising:
- a housing including a plurality of internal teeth;
- a non-rotatable disc extending about an axis and including a plurality of first external teeth extending radially away from said axis and each defining a first tooth thickness;
- a rotatable disc extending about said axis and including a plurality of second external teeth extending radially away from said axis and each defining a second tooth thickness;
- wherein each of said first external teeth engage a respective one of said plurality of internal teeth to prevent relative rotation about said axis between said non-rotatable disc and said housing;
- wherein each of said second external teeth engage a respective one of said plurality of internal teeth to allow a finite degree of relative rotation about said axis between said rotatable disc and each of said non-rotatable disc and said housing to rotate said rotatable disc between a closed position and an open position to control flow of fluid from said non-rotatable disc.

15. A HOWC assembly, as set forth in claim 14, wherein said non-rotatable disc defines at least one exhaust port extending therethrough;
- wherein said rotatable disc covers said at least one exhaust port when said rotatable disc is in said closed position to prevent fluid flow out through said at least one exhaust port;
- wherein said rotatable disc uncovers said at least one exhaust port when said rotatable disc is in said open position to allow fluid to flow out through said at least one exhaust port.

16. A HOWC assembly, as set forth in claim 14, wherein said rotatable disc defines at least one exhaust groove extending therethrough;
- wherein said at least one exhaust groove opens to a respective one of said exhaust port when said rotatable disc is in said open position to allow fluid to flow out through said at least one exhaust port and said exhaust groove.

17. A HOWC assembly, as set forth in claim 16, further comprising at least one exhaust passage fluidly interconnecting said apply pressure cavity and said at least one exhaust port.

18. A HOWC assembly, as set forth in claim 14, wherein said housing defines an apply pressure cavity in fluid communication with said at least one exhaust port.

19. A transmission comprising:
- a hydraulic one-way clutch assembly (HOWC assembly) extending about an axis and configured for engagement to transmit torque about said axis when said HOWC assembly is engaged, said HOWC assembly including;
- a housing including a plurality of internal teeth;
- a non-rotatable disc extending about an axis and including a plurality of first external teeth extending radially away from said axis and each defining a first tooth thickness;
- a rotatable disc extending about said axis and including a plurality of second external teeth extending radially away from said axis and each defining a second tooth thickness;
- wherein each of said first external teeth engage a respective one of said plurality of internal teeth to prevent relative rotation about said axis between said non-rotatable disc and said housing;
- wherein each of said second external teeth engage a respective one of said plurality of internal teeth to allow a finite degree of relative rotation about said axis between said rotatable disc and each of said non-rotatable disc and said housing to rotate said rotatable disc between a closed position and an open position to control flow of fluid from said non-rotatable disc;
- a second clutch assembly extending about said axis and configured for engagement to transmit torque about said axis when said second clutch assembly is engaged; and
- a control system operatively connected to said HOWC assembly and said second clutch assembly to shift engagement between said HOWC assembly and said second clutch assembly;
- wherein said control system operates to engage one of said HOWC assembly and said second clutch assembly to transmit torque therethrough;
- wherein said control system operates to disengage the other of said HOWC assembly and said second clutch assembly to eliminate the transmission of torque therethrough.

\* \* \* \* \*